(12) United States Patent
Anand et al.

(10) Patent No.: US 11,126,601 B2
(45) Date of Patent: Sep. 21, 2021

(54) ENSURING DATA QUALITY THROUGH DEPLOYMENT AUTOMATION IN DATA STREAMING APPLICATIONS

(71) Applicant: PAYPAL, INC., San Jose, CA (US)

(72) Inventors: Siddharth Anand, Santa Clara, CA (US); Anisha Nainani, Fremont, CA (US); Jianliang Chen, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 232 days.

(21) Appl. No.: 16/380,947

(22) Filed: Apr. 10, 2019

(65) Prior Publication Data

US 2020/0327103 A1 Oct. 15, 2020

(51) Int. Cl.
*G06F 16/00* (2019.01)
*G06F 16/215* (2019.01)
*G06F 11/14* (2006.01)

(52) U.S. Cl.
CPC ........ *G06F 16/215* (2019.01); *G06F 11/1464* (2013.01); *G06F 2201/84* (2013.01)

(58) Field of Classification Search
CPC ............... G06F 2201/84; G06F 16/215; G06F 16/24568; G06F 11/1464; G06F 11/3055; G06F 11/3006; G06F 11/3034; G06F 2201/88; G06F 2201/86; G06F 11/1469
See application file for complete search history.

(56) References Cited

U.S. PATENT DOCUMENTS

| | | | |
|---|---|---|---|
| 8,065,233 B2 | 11/2011 | Lee et al. | |
| 8,433,869 B1 * | 4/2013 | Natanzon | G06F 11/1471 711/162 |
| 9,449,047 B2 | 9/2016 | Babkin et al. | |
| 2008/0120129 A1 * | 5/2008 | Seubert | G06Q 10/10 705/35 |
| 2009/0037769 A1 * | 2/2009 | Babkin | G06F 16/211 714/15 |

(Continued)

FOREIGN PATENT DOCUMENTS

CA 2997815 6/2017

OTHER PUBLICATIONS

International Search Report and Written Opinion, PCT/US2020/027331, dated Jun. 22, 2020, 77 pages.

*Primary Examiner* — Shiow-Jy Fan
(74) *Attorney, Agent, or Firm* — Haynes and Boone, LLP

(57) ABSTRACT

Data streaming applications may need to provide high reliability, particularly depending on the nature of the data being streamed. A framework is described that allows a data streaming application to ensure high reliability both during update operations and during ordinary operations. A unique event ID count can be recorded that reflects messages being sent from a source to the streaming application. After an update and service restart, the count can again be collected to see if data is flowing through the streaming application as expected. Unique database record counts can be reviewed (e.g. after a restart or during ordinary operations) to ensure that no records are being unexpectedly dropped. Data content sampling can also be performed to see that any data transformations are functioning properly. Corrective actions (after a restart or during ordinary operations) can also be taken, including replay of database messages that are dropped, or sending an alert.

20 Claims, 7 Drawing Sheets

(56) References Cited

U.S. PATENT DOCUMENTS

| | | |
|---|---|---|
| 2016/0036894 A1 | 2/2016 | Collins et al. |
| 2017/0039564 A1 | 2/2017 | Lanc |
| 2017/0116089 A1* | 4/2017 | Park .................... G06F 9/542 |
| 2018/0276299 A1 | 9/2018 | Li et al. |
| 2019/0043125 A1* | 2/2019 | Cropper ................ G06Q 30/01 |

* cited by examiner

ENSURING DATA QUALITY THROUGH DEPLOYMENT AUTOMATION IN DATA STREAMING APPLICATIONS

TECHNICAL FIELD

This disclosure relates to improvements in data streaming platforms, and more particularly to the reliability and availability of data streaming both during normal operations and deployment/update operations, according to various embodiments.

BACKGROUND

Data streaming services can provide a variety of information to users. In some instances, like a social media platform, it may not be problematic if the platform does not make a post available for viewing to others until minutes or even hours later. For example, a user may not notice (or care) if there is an interruption in service that results in certain content being displayed to them with a notable time delay, or even not being displayed to them at all.

In other instances, however, users of a data streaming service may be particularly interested in seeing new streaming information displayed in a quick and reliable manner. When a data streaming service provides streaming content non-stop (e.g. 24 hours a day, seven days a week), providing the highest levels of reliability can be challenging. Technical difficulties or other conditions encountered during normal operations can potentially cause delays and/or loss of data for streaming applications. Deployment of updates to a platform streaming service can also cause service interruptions. Applicant recognizes that data streaming services can be improved to provide better reliability, both during ordinary operations and for operation during a new code deployment/update.

DETAILED DESCRIPTION

Figure 1:
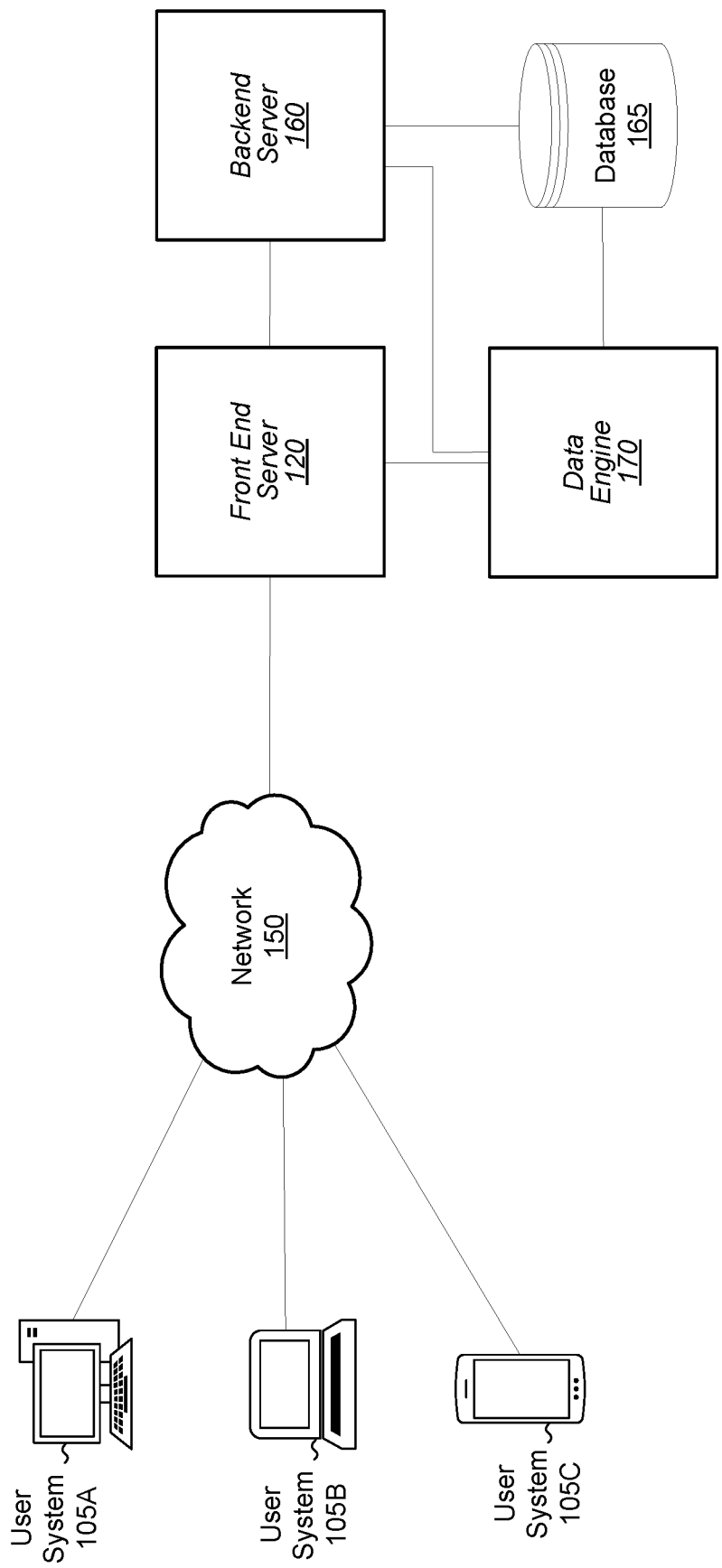
FIG. 1 illustrates a block diagram of a system including user systems, a front end server, backend server, data engine, and database, according to some embodiments.

Techniques are described relating to a data streaming application, and in particular, techniques that can be used to improve reliability of data streaming (e.g. ensuring that data is sent to consumers within a particular amount of time and without dropping any data). This may be particularly desirable when reporting financially related streaming data, such as records of completed electronic payment transactions. A merchant who has just conducted a sale, for example, may wish to see that sale reflected on a streaming data feed of transactions within a short amount of time (e.g. under a minute). If the transaction is not timely reported (or is never reported due to a data loss or mishandling) this can have a negative impact on platform usage.

Accordingly, data streaming applications may need to provide high reliability. A framework is described that allows a data streaming application to provide high reliability both during update operations and during ordinary (e.g. non-update) operations. For an update, data pipeline event ID counts can be recorded that reflect a quantity of messages being sent from a data source to the streaming application. During an update, operations may be halted for a brief time (even while database messages that are in-flight remain in processing queues) while one or more executable files are updated. After the update, a stream processing application may be restarted.

Data message counts can be collected after restart to see if data is flowing through the streaming application as expected. For each change to a record in a database, a unique key (e.g. a unique event ID) may be associated with that change. This unique event ID could be a database sequence number, e.g., a unique sequence number for a particular database that is assigned when a write/modification is made to a database record. Thus, for example, if a record is changed 3 times, 3 different unique event IDs will be generated in various embodiments. This is different from other types of database sequence numbers used to uniquely identify database records. The sequence numbers mentioned here may thus uniquely identify changes to a record in various embodiments, as streaming data may be a stream of a log of changes to records, where it may make sense to compare counts of those logs.

Thus, unique database record change counts can be reviewed—after a restart or during ordinary operations, for example—to ensure that no record changes are being unexpectedly dropped. If a unique event ID count for data entering a streaming application (e.g. at the beginning of a data pipeline, when data is loaded from a database) is the same as a unique event ID count for data leaving the streaming application, this indicates that the streaming application is not dropping any record changes (or unnecessarily duplicate a record change such as executing 2 or more inserts when one would be sufficient). Event ID counts can be taken in a particular time window, such as one minute, with the expectation that all the event ID counts within that window should later be seen exiting from the streaming application, in various embodiments.

Data content sampling can also be performed to see that any data handling is functioning properly—e.g. ensuring that particular data within a database message is not being dropped, corrupted, or otherwise mishandled. In general, the stream processing application may act as a service between one or more source databases and an end user (e.g. a software application that displays data to a person). If post-restart monitoring or ongoing monitoring for ordinary operations indicates a problem with the stream processing application, a corrective action can also be taken. These corrective actions can include sending an alert message, and also replaying database messages (automatically and without human intervention) to ensure better quality of service.

This specification includes references to "one embodiment," "some embodiments," or "an embodiment." The appearances of these phrases do not necessarily refer to the same embodiment. Particular features, structures, or characteristics may be combined in any suitable manner consistent with this disclosure.

"First," "Second," etc. As used herein, these terms are used as labels for nouns that they precede, and do not necessarily imply any type of ordering (e.g., spatial, temporal, logical, cardinal, etc.).

Various components may be described or claimed as "configured to" perform a task or tasks. In such contexts, "configured to" is used to connote structure by indicating that the components include structure (e.g., stored logic) that performs the task or tasks during operation. As such, the component can be said to be configured to perform the task even when the component is not currently operational (e.g., is not on). Reciting that a component is "configured to" perform one or more tasks is expressly intended not to invoke 35 U.S.C. § 112(f) for that component.

Turning to FIG. 1, a block diagram of a system 100 is shown, according to various embodiments. In this diagram, system 100 includes user systems 105A, 105B, and 105C. System 100 also includes front end server 120, backend server 160, database 165, data engine 170, and network 150. The techniques described herein can be utilized in the environment of system 100, as well as numerous other types of environment.

Note that many other permutations of FIG. 1 are contemplated (as with all figures). While certain connections are shown (e.g. data link connections) between different components, in various embodiments, additional connections and/or components may exist that are not depicted. As will be appreciated by one of skill in the art, various devices may be omitted from this diagram for simplicity—thus, in various embodiments, routers, switches, load balancers, computing clusters, additional databases, servers, and firewalls, etc., may all be present. Components may be combined with one other and/or separated into one or more systems in this figure, as in other figures.

User systems 105A, 105B, and 105C ("user systems 105") may be any user computer system that can potentially interact with front end server 120, according to various embodiments. Front end server 120 may provide web pages that facilitate one or more services, such as account access and electronic payment transactions (as may be provided by PayPal.com™). Front end server 120 may thus also facilitate access to various electronic resources, which can include an account, data, and various software programs/functionality, etc.

A merchant may control user system 105A (as just one example) in some instances, and may use this systems to conduct sales transactions. An application on user system 105A may show a feed of data to the merchant—for example, providing a record of electronic payment transactions that have been executed. Merchants especially may want to see near real-time confirmation (e.g. within a minute) of their transactions—such as may be provided by a data stream listing all transactions conducted by an account. Consumers, of course, may also receive a data stream of their transactions (e.g. that were conducted using a PayPal™ account).

Front end server 120 may thus be any computer system configured to provide access to electronic resources. This can include providing web content, in various embodiments, as well as access to functionality provided a web client (or via other protocols, including but not limited to SSH, FTP, database and/or API connections, etc.). Services provided may include serving web pages (e.g. in response to a HTTP request) and/or providing an interface to functionality provided by backend server 160 and/or database 165. Database 165 may include various data, such as user account data, system data, and any other information. Multiple such databases may exist, of course, in various embodiments, and can be spread across one or more data centers, cloud computing services, etc. Front end server 120 may comprise one or more computing devices each having a processor and a memory. Network 150 may comprise all or a portion of the Internet.

Front end server 120 may correspond to an electronic payment transaction service such as that provided by PayPal™ in some embodiments, though in other embodiments, front end server 120 may correspond to different services and functionality. Front end server 120 and/or backend server 160 may have a variety of associated user accounts allowing users to make payments electronically and to receive payments electronically. A user account may have a variety of associated funding mechanisms (e.g. a linked bank account, a credit card, etc.) and may also maintain a currency balance in the electronic payment account. A number of possible different funding sources can be used to provide a source of funds (credit, checking, balance, etc.). User devices (smart phones, laptops, desktops, embedded systems, wearable devices, etc.) can be used to access electronic payment accounts such as those provided by PayPal™. In various embodiments, quantities other than currency may be exchanged via front end server 120 and/or backend server 160, including but not limited to stocks, commodities, gift cards, incentive points (e.g. from airlines or hotels), etc. Server system 120 may also correspond to a system providing functionalities such as API access, a file server, or another type of service with user accounts in some embodiments (and such services can also be provided via front end server 120 in various embodiments).

Database 165 can include a transaction database having records related to various transactions taken by users of a transaction system in the embodiment shown. These records can include any number of details, such as any information related to a transaction or to an action taken by a user on a web page or an application installed on a computing device (e.g., the PayPal app on a smartphone). Many or all of the records in database 165 are transaction records including details of a user sending or receiving currency (or some other quantity, such as credit card award points, cryptocurrency, etc.). The database information may include two or more parties involved in an electronic payment transaction, date and time of transaction, amount of currency, whether the transaction is a recurring transaction, source of funds/type of funding instrument, and any other details. Such information may be used for bookkeeping purposes as well as for risk assessment (e.g. fraud and risk determinations can be made using historical data; such determinations may be made using systems and risk models not depicted in FIG. 1 for purposes of simplicity). As will be appreciated, there may be more than simply one database in system 100. Additional databases can include many types of different data beyond transactional data. Any description herein relative to database 165 may thus be applied to other (non-pictured) databases as well.

Backend server 160 may be one or more computing devices each having a memory and processor that enable a variety of services. Backend server 160 may be deployed in various configurations. In some instances, all or a portion of the functionality for web services that is enabled by backend server 160 is accessible only via front end server 120 (e.g. some of the functionality provided by backend server 160 may not be publicly accessible via the Internet unless a user goes through front end server 120 or some other type of gateway system).

Data engine 170 likewise may be one or more computing devices each having a memory and processor. In various embodiments, data engine 170 performs operations related to a stream processing application. Data engine 170 may thus transmit information to and/or receive information from a number of systems, including database 165, front end server 120, and back end server 160, as well as other systems, in various embodiments. Data engine 170 thus may run one or more executable processes that comprise stream processing application 205 (discussed further below).

Figure 2:
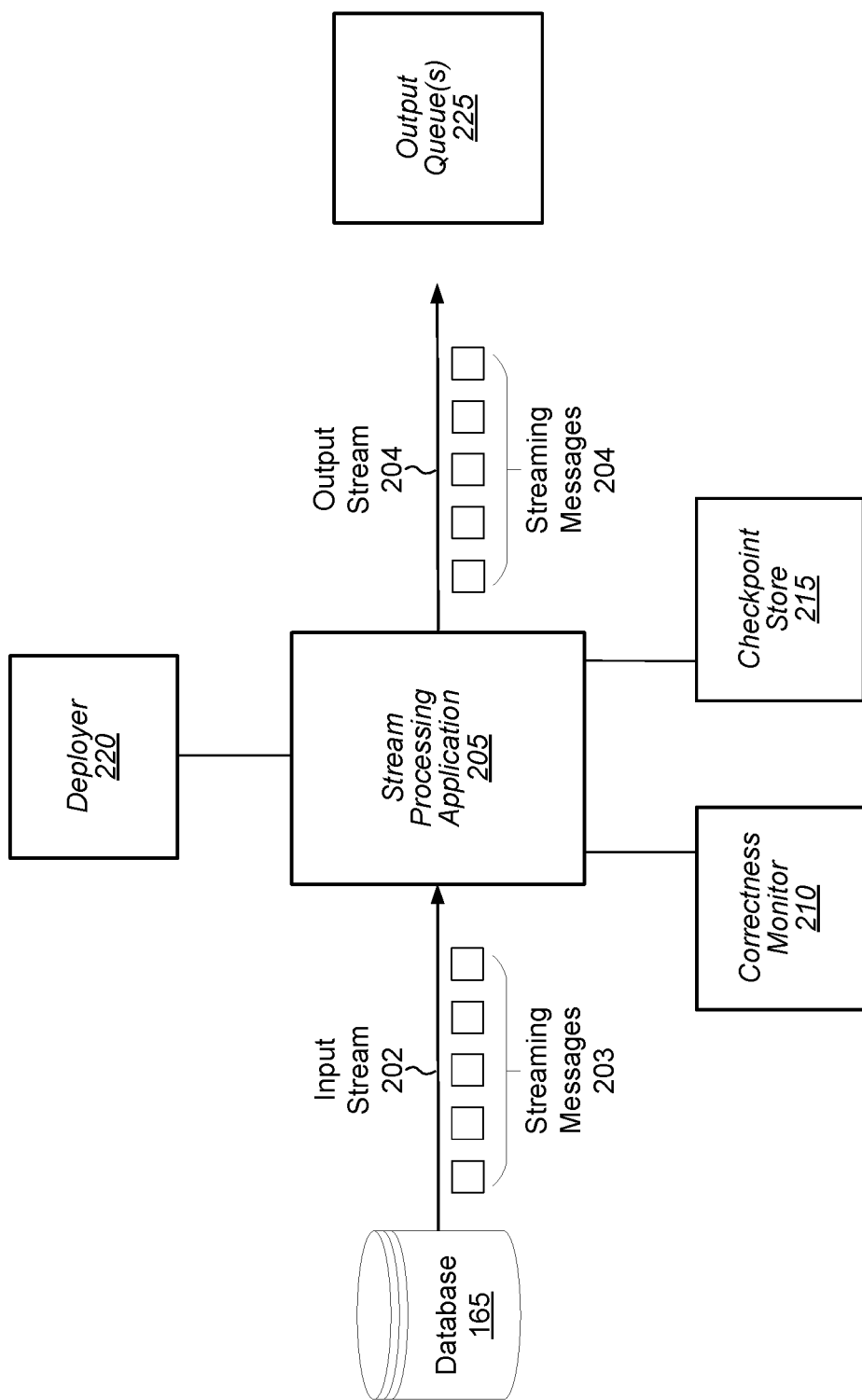
FIG. 2 illustrates a diagram relating to a flow of data through a stream processing application, according to some embodiments.

Turning to FIG. 2, a diagram is shown of a system 200 relating to a flow of data through a stream processing application, according to various embodiments. Concepts introduced relative to this diagram will be explained in further detail relative to other diagrams further below.

In FIG. 2, streaming messages 203 are sent from database 165 to stream processing application 205 via input stream 202. One or more processing actions may be taken on these messages, which may then be sent as streaming messages 204 via output stream 204 to one or more output queues 225. Stream processing application 205 may thus process a constant flow of incoming data and send out a corresponding constant flow of outbound data.

Stream processing application can include one or more different executable files as well as associated data (e.g. configuration files, logs, images, text, etc.). The executable files can include JAR (Java archive) files in some instances, but may be another type of executable file in other embodiments. Executable files may include various computer-executable instructions, including but not limited to Java bytecode and compiled native binary instructions, but may also include additional information (e.g. text, images, configuration information, and/or other media).

Correctness monitor 210 may interface with stream processing application 205 to ensure that data is being processed correctly. More particularly, correctness monitor 210 may verify unique message counts (e.g. ensure that no messages have been dropped) from stream processing application 205, and may also measure content validity (e.g. ensuring that streaming message contents have not been corrupted or incorrectly transformed, which can be done by sampling techniques in some embodiments, as it may be impractical to check content for each and every streaming message).

Checkpoint store 215 may house checkpoint data for one or more checkpoints of stream processing application 205. A checkpoint may be taken before an application update, for example, that allows stream processing application 205 to automatically be rolled back to a previously stored version if a newer version of stream processing application 205 does not appear to be operating correctly. Deployer 220 can help deploy new code as well as take related operations.

Figure 3:
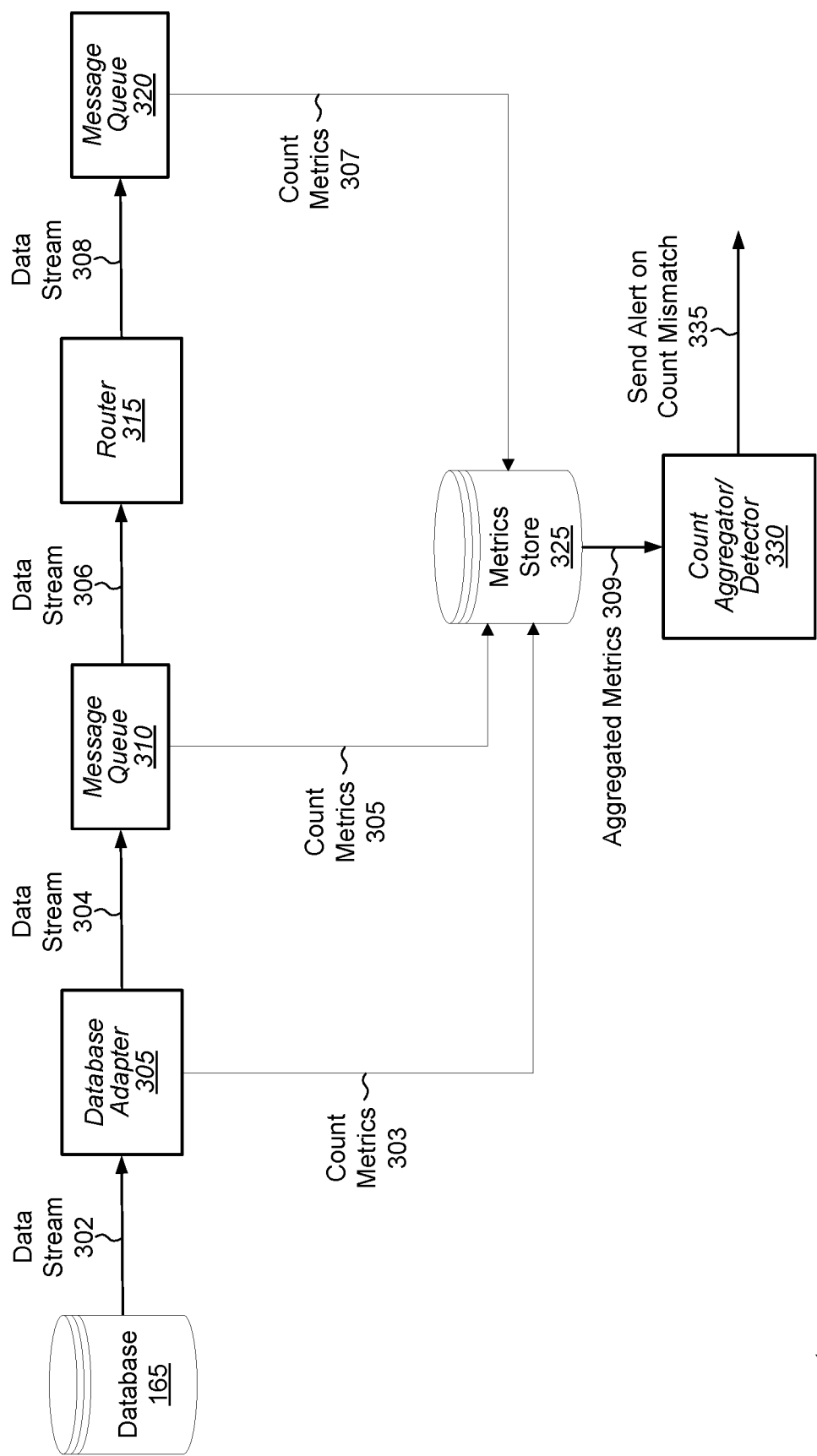
FIG. 3 illustrates a diagram relating to operations for checking count metrics for a stream processing application, according to some embodiments.

Turning to FIG. 3, a diagram 300 is shown relating to operations for checking count metrics for stream processing application 205, according to various embodiments. Count metrics may be checked to ensure that stream processing application 205 is functioning properly after an update, or more generally to ensure that the application is performing as expected during ordinary operations, in various embodiments. Messages (e.g. data from data records originating in database 165) may be passed along, in this figure, between various components as part of data streams 302, 304, 306, and 308.

Database adapter 305 may be configured to interface with particular source databases (e.g. an Oracle™ database, MySQL™ database, or other type of database), and thus may read records from database 165. Count metrics 303 are captured at database adapter 305, e.g., relating to a unique number of records read from database 165. This can be done by looking at a unique key for the records—such as a database timestamp corresponding to the time an electronic transaction was recorded in the database. At message queue 320, additional count metrics 305 are captured and sent to metrics store 325. As noted elsewhere, all such count metrics may include a count of unique messages (e.g. a count of database event IDs that correspond to particular database record changes for a particular database, where the event IDs are unique within a given database such that there is no duplication). The count at message queue 310 may include de-duplication operations (as duplicate messages can inadvertently be introduced in some embodiments). Router 315 may then perform one or more operations on messages in data stream 306, such as transforming or otherwise processing data messages. Messages are then output to message queue 320, where further count metrics 307 are collected regarding the number of unique messages.

Aggregated metrics 309 can then be sent to a count aggregator/detector 330. Detector 330 can calculate whether all expected unique message count metrics are matching correctly (e.g. for a particular time window), or whether one or more messages may have been dropped (e.g. within that particular time window). If a message is dropped, it may be replayed from the source database to ensure correct processing, but an alert may also be sent on detection of a count mismatch in operation 335. This alert can be sent to an analyst, for example, who may take action to resolve the issue. Note that in some embodiments, a message count check is performed for all messages processed by stream processing application 205 (i.e., message count checks may be performed not only after an application update and restart, but on an ongoing basis for all messages during normal operations).

Figure 4:
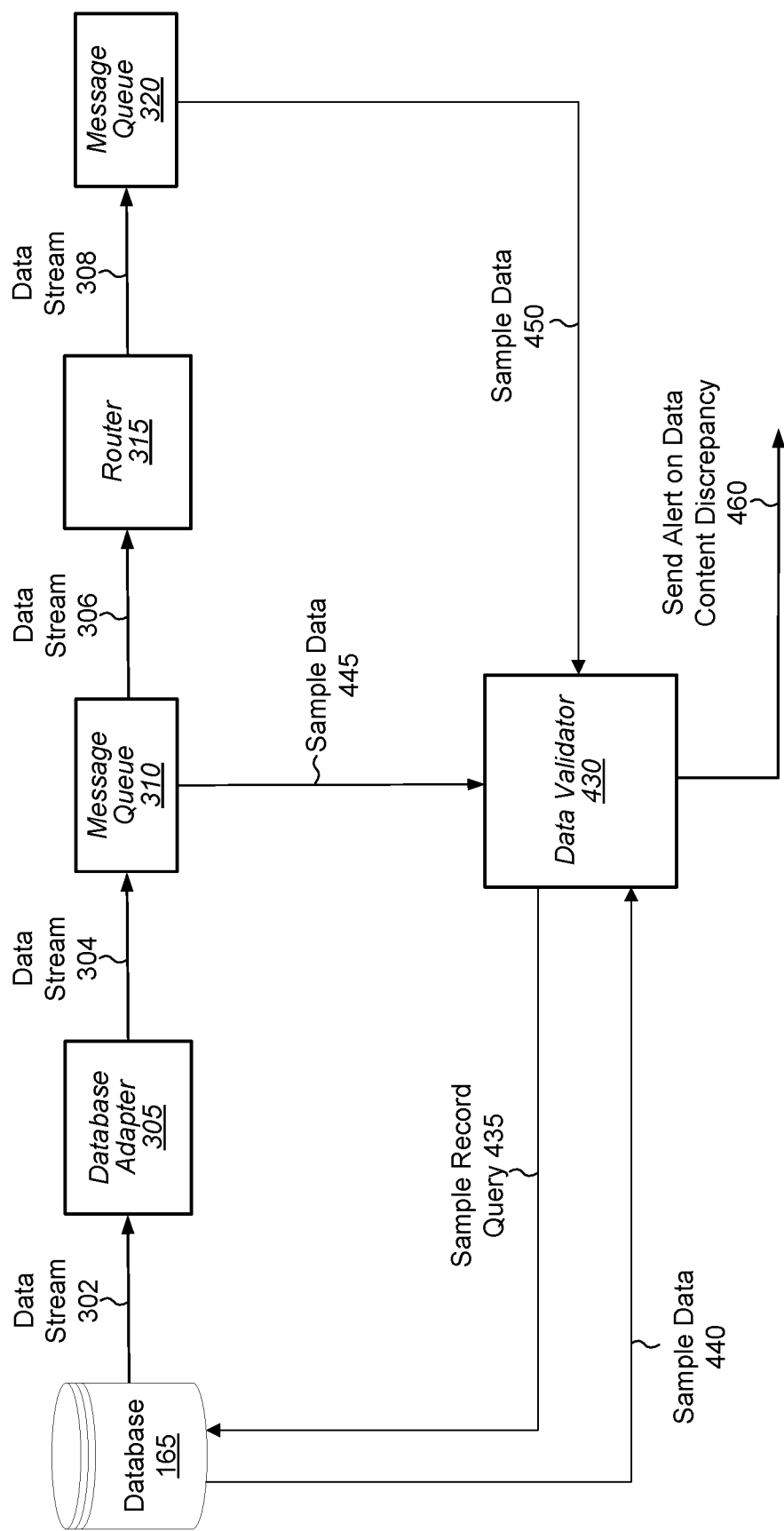
FIG. 4 illustrates a diagram relating to operations for checking data content for a stream processing application, according to some embodiments.

Turning to FIG. 4, a diagram 400 is shown relating to operations for checking data content for stream processing application 205, according to some embodiments. Data content at different stages (e.g. pre- and post-processing) may be checked to ensure that stream processing application 205 is functioning properly after an update, or more generally to ensure that the application is performing as expected during ordinary operations, in various embodiments. Some portions of FIG. 4 correspond to that of FIG. 3 and may function similarly or identically in various embodiments.

In operation 435, data validator 430 makes a sample record query 435 to database 165. Database 165 may then respond with sample data 440. Sample data 445 may also be received at data validator 430 from message queue 310 (prior to messages being processed by router 315). Sample data 450 may likewise be received at data validator 430 from message queue 320 (after messages are processed by router 315). Data validator 430 may then compare content of the various sampled data (e.g. for particular database records) to ensure that the content matches as expected. If a discrepancy is detected, this may indicate that stream processing application 205 is malfunctioning (e.g., a newly updated executable file may be causing corruption of the data, or some other issue may be causing data corruption during ordinary operations). When a discrepancy is detected, an alert may be sent in operation 460. This alert can be sent to an analyst, for example, who may take action to resolve the issue. Note that in some embodiments, a data content check is performed for only some of the messages processed by stream processing application 205. Sampling can be used (e.g., check content for one in one thousand messages, or some other frequency) after an application update and restart to ensure application correctness. Data content checks via sampling can also be performed an ongoing basis during normal operations as well.

Figure 5:
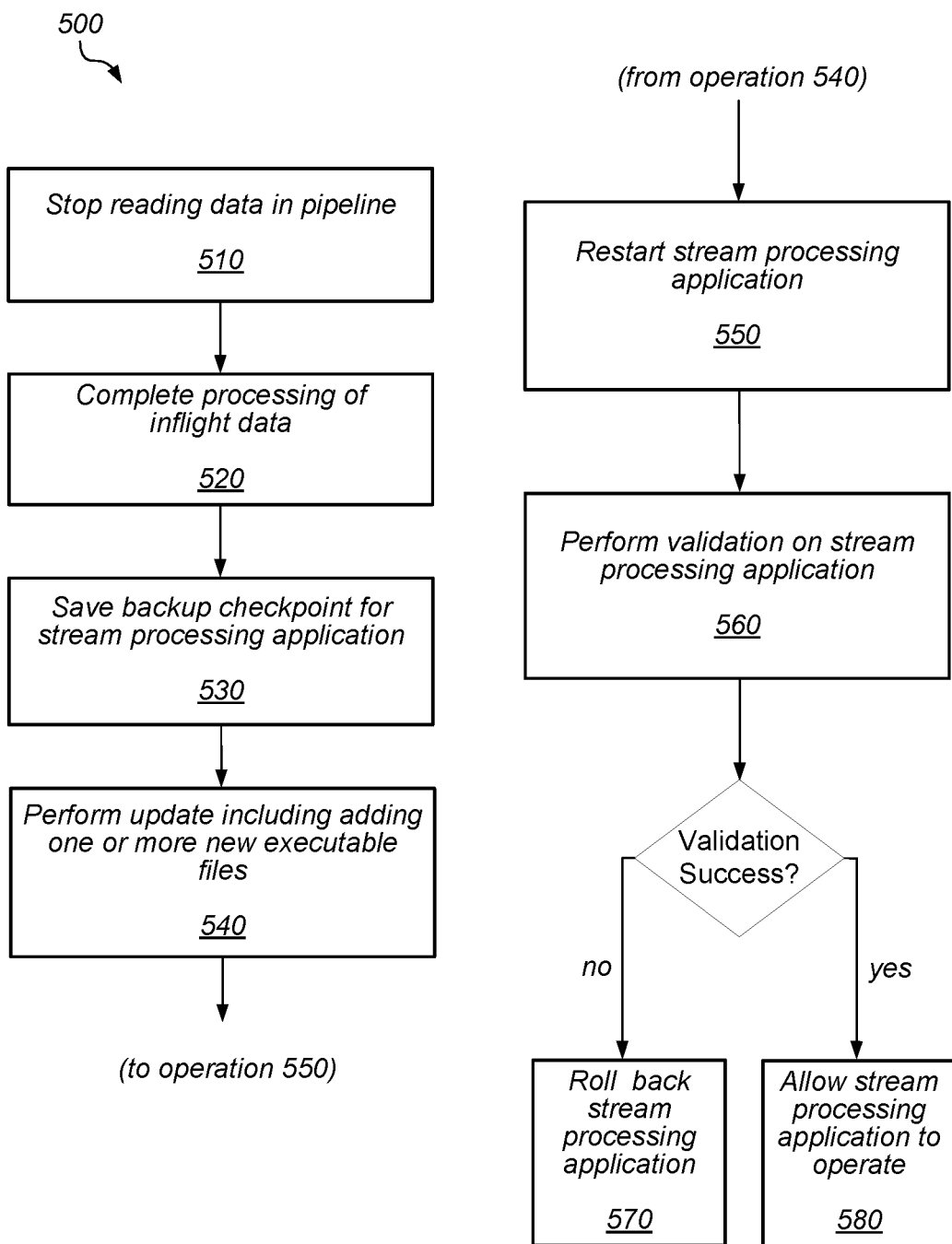
FIG. 5 illustrates a flowchart relating to a method of updating a stream processing application, according to some embodiments.

Turning to FIG. 5, a flowchart is shown of one embodiment of a method 500 relating to updating stream processing application 205, according to various embodiments.

Operations described relative to FIG. 5 may be performed, in various embodiments, by any suitable computer system and/or combination of computer systems, including data engine 170.

For convenience and ease of explanation, operations described below will simply be discussed relative to data engine 170 rather than any other system, however. Further, various operations and elements of operations discussed below may be modified, omitted, and/or used in a different manner or different order than that indicated. Thus, in some embodiments, data engine 170 may perform one or more operations while another system might perform one or more other operations.

Prior to describing the operations of FIG. 5, note that stream processing application 205 may handle one or more data streams. A data stream can be defined by the tuple [source, destination] or [source, transformation, destination] when a data transformation effect is present. In various embodiments, a single data stream/stream processing pipeline will not consume data from more than one source database (e.g. the stream processing pipelines may be Simple Event Processing pipelines, rather than Complex Event Processing pipelines). Simple Event Processing pipelines are logistically easier to handle in various embodiments, as event IDs may not be necessarily be unique between different databases, and combining data records from different databases for streaming purposes thus could require additional coherency and validation mechanisms beyond those needed for data pipelines where only a single source database is used.

Event IDs for a database, more specifically, are a unique identifier for any change made to that database. Consider the example of a particular database record that gets modified five different times throughout a day. A database key for this record (such as a unique record ID) would remain unchanged in this example—it is the same record, just some of the data inside the record is being changed.

Thus, all changes for a database may be logged with an associated unique event ID for each change. This can be thought of as sequence numbers in a database's "re-do" log. The unique event IDs may be handed out sequentially based on an ordering of database commits, as one example. In some cases, unique event IDs for a database pipeline may correspond to a data source other than a database as well.

An event ID log associated with the record, however, would be updated for each of the five different changes. Thus, each of the five record changes would have an associated unique event ID—five new event IDs would be generated as a result of the record changes. These unique event IDs can thus be used to replay database messages, such as when a database message has been dropped somewhere within a pipeline for data streaming application 205 (this aspect will be discussed in more detail below).

In operation 510, data engine 170 stops reading data in one or more data pipelines of stream processing application 205, according to some embodiments. Thus, reads from a source database that is being used to provide data to a pipeline for processing may be halted (at least temporarily) as update operations proceed for stream processing application 205. A maintenance mode (see further below) can be used to effect operation 510 in some embodiments.

In operation 520, data engine 170 completes processing of inflight data for one or more data pipelines of stream processing application 205, according to some embodiments. This may include sending data through a transformation component such as router 315 and/or transmitting inflight data to an output queue such as message queue 320.

Completing processing of inflight data can include fully draining one or more message buffers for the stream processing application 205. For example, a particular data pipeline may have 100 unique database records (or portions thereof) in message queue 310. These records may all be processed and passed through stream processing application 205, so that at the end of operation 520, message queue 310 (and/or other data storage structures) does not have any data still waiting to be processed and transmitted to an end user (e.g. a consuming application and/or person).

Halting stream processing application 205 can include both operation 510 (stopping the reading of data) and operation 520 (completing inflight data processing) in various embodiments. Halting stream processing application 205 can also include stopping execution of one or more executable processes of the stream processing application. Stopping execution of a process may include killing the process, in some instances, or may include pausing the process so that it does not execute any additional instructions (but may be partly or wholly retained in memory while paused).

A maintenance mode may also be used in association with halting stream processing application 205. The maintenance mode may prevent restarting a data pipeline that is halted due to the maintenance mode being on. That is, maintenance mode may halt a number of data pipelines (e.g. storage structures for a flow of data coming from one or more source databases and being processed through stream processing application 205). A self-healing feature of stream processing application 205 may, in normal operations, attempt to restart a data pipeline if it is halted (in response to the pipeline encountering some kind of transient error, for example). However, this kind of self-healing can cause problems during an update unless it is disabled (via maintenance mode), according to various embodiments. Likewise, the maintenance mode can also prevent new data pipelines being started by the stream processing application.

In operation 530, data engine 170 saves a backup checkpoint for stream processing application 205, according to some embodiments. Saving a backup checkpoint may include storing various state and/or configuration information regarding stream processing application 205, as well as storing one or more executable files for stream processing application 205. For example, if one or more executable files are going to be replaced in an update for stream processing application 205, copies may be saved of one or more (older) executable files of the stream processing application that will be replaced by one or more newer executable files. In this manner, stream processing application 205 can be restored to a prior operating state in the event that an update is unsuccessful and/or appears to cause data streaming problems. Note that in various embodiments, inflight data (such as may be stored in message queue 310 or other locations) will be processed and drained from any buffers prior to saving the backup checkpoint.

In operation 540, subsequent to the halting, data engine 170 performs an update comprising adding one or more new executable files to stream processing application 205, according to various embodiments. Executable files for stream processing application 205 can be used to perform various tasks, but in some cases, may take particular source data (e.g. from database 165) and perform one or more operations on that source data before sending it on, e.g. toward an output queue where the processed data may be consumed by another application, such as a streaming data client that displays streaming data to a user. Such a streaming data client could be a web application or mobile phone app, for example, that displays results of electronic payment transactions to a user (e.g. a PayPal™ user might see a record of all their successful and unsuccessful transactions in an app on their phone).

The operations performed on source data by an executable file for stream processing application 205 can include, for example, packaging data from one or more database records into a single data package destined for a particular end user (which can be an individual or a software application). Data may also be reformatted as needed for an end user. Some data from a source record can be dropped during this reformatting (e.g. certain data in a database source record may have privacy protection settings associated with it and that data may be omitted when it is sent out by stream processing application 205).

Stream processing application 205 may also be configured to provide output information within a particular specified amount of time, e.g., according to a service level agreement (SLA). For example, an SLA may specify that 100% (or some other percent, e.g. 90%, 99.99%) of data that is input into stream processing application 205 must be output (e.g. to an end user and/or to a message queue for an end user) within a certain amount of time, such as 15 seconds, 60 seconds, 2 minutes, or some other period of time. Such SLAs may be particularly important to ensuring a good customer experience, e.g., if a merchant conducts a payment transaction she may expect to see a record of that transaction in her payment application within a relatively short period of time (rather than wondering, e.g., if a $2,000 charge to a customer went through properly).

In operation 550, after the update, data engine 170 restarts stream processing application 205, according to various embodiments. Restarting stream processing application 205 may include initiating execution of one or more stopped executable processes of the stream processing application (e.g. unpausing a process that had been paused, and/or beginning execution of a process that had been killed). An executable process that was killed because it was being updated with a new version, for example, might be fully re-started, while a paused process (e.g. that was not being updated) might be resumed in this operation.

In operation 560, subsequent to the restarting in operation 550, data engine 170 may perform a validation on the stream processing application, according to various embodiments. This validation process can be performed in order to ensure that the stream processing application is functioning correctly following an update (and if not, the stream processing application might be rolled back to a prior version using a stored checkpoint).

Validation in operation 560 can include various steps, including a count checking aspect that ensures that database records are not being lost, and a content checking aspect that examines data contents to verify that data is being handled properly (e.g. not being corrupted or lost). Thus, validation can include collecting a first plurality of inbound unique event IDs for a first time window after the restart, where each of the first plurality of inbound unique event IDs corresponds to a particular database record.

Collecting the first plurality of inbound unique event IDs can include collecting the event IDs at one or more locations associated with stream processing application 205. Thus, operation 560 can include collecting event IDs at database adapter 305 and/or message queue 310, for example. Each of these event IDs may be associated with a particular change within database 165 (such as a record being added or modified, for example).

When data is sent from database 165 to stream processing application 205, the corresponding event IDs are also included, in various embodiments. Thus, each of the inbound unique event IDs can correspond to a particular database record. However, note that because the event IDs are associated with data changes, it can be the case that two or more of those event IDs may correspond to the same record. In a group of 25 inbound unique event IDs, for example, 22 of those unique event IDs may correspond to 22 different database records that were added to database 165, while three of those unique event IDs might correspond to a single pre-existing database record that was modified three different times.

The first time window after the restart for stream processing application 205 can be any arbitrary length of time, but is 60 seconds in some embodiments. For example, immediately after restart, all inbound unique event IDs to data streaming application from 0.0 seconds to 60.0 seconds may be logged as seen at database adapter 305. Subsequently, it is expected that all of these unique event IDs would eventually be processed by stream processing application 205, and sent to an end user (e.g. a software application that consumes the produced streaming data).

Thus, validation in operation 560 also includes subsequent to the end of the first time window, determining whether each of the first plurality of unique event IDs has been collected at a location outbound from the stream processing application and/or message queue 310 and/or any other determined location. A list of the unique event IDs at the two (or more) different locations is compared, and if an event ID is missing at a later location in the pipeline, then a deduction can be made that event ID has been lost, and needs to be replayed.

Determining whether all the event IDs within a time window (e.g. 60 seconds following restart of stream processing application 205) can include waiting a particular period of time before determining whether a given unique event ID is missing. For example, an additional 30 seconds, 60 seconds, five minutes, ten minutes, or some other period of time can be used. Particularly after restart, stream processing application 205 may be reading larger amounts of data from database 165 (as data reading is paused during update). Thus, there may be a longer than usual delay to process some of the initial event IDs in the pipeline following restart. However, if after some particular amount of time has passed and an inbound event ID seen earlier in the pipeline (e.g. at database adapter 305) has not been seen at a later stage of the pipeline (e.g. message queue 320), then stream processing application may determine that the data associated with that event ID has been lost and/or mishandled.

The post-restart validation process will fail in various embodiments if an event ID is not seen at a later stage in the pipeline. However, if all event IDs within a particular time window are seen at the later stage in the pipeline (e.g., all stages of the pipeline eventually reflect that the database message passed that event ID through for processing), then the validation process succeeds, according to various embodiments.

During validation for the restart process, additional event IDs for additional time windows may also be verified via count. Thus, a second time window (e.g. subsequent to a first time window) could have inbound event IDs collected at one location, and then collected again at a downstream location to determine if any event IDs had been lost. This process may function similarly to that detailed above.

Pipeline count metrics may be generally based as a function of time intervals (windows). The width of a time interval can be one minute (60 seconds), or some other number. Counts based on such a time interval can be published, e.g., pushed to an orchestration or monitoring component. Note that generally, in event processing, there are two different times that can be associated with an event: the event time and the processing time. The event time typically correlates to the birth time of an event. As that event passes through different parts of a stream processing application, it may be processed. The times at which an event is processed at a component are known as the processing time of an event E at a component C. Hence, while an event only has a single event (birthtime) time, in various embodiments, it can have several processing times associated with it.

In order to track data within a pipeline (e.g. including taking a count validation check at different pipeline stages), the count of events for a given one minute wide window can be captured based on event times of those events. This metric can be captured at each hop in a stream processing pipeline, and those metrics can be compared to determine if any data loss is present. Event time is a convenient tracking mechanism for data count validation, in some embodiments, because while the processing time of an event may increase as it progresses down the pipeline, its event time (e.g. birth time) is constant. (Note that the term "data pipeline" or "pipeline" as used herein may comprise one or more intermediate storage structures for particular data originating from a particular database source and destined to one or more end users.)

The validation performed in operation 560 may also include comparing pre-processing data content to post-processing data content output by the stream processing application. Data content from database 165 (e.g. prior to having one or more operations performed on it by data streaming application 205) may be compared to data that has been processed by the data streaming application to determine if the data is being correctly handled. For example, if a particular data record read from database 165 (or any other database) has a transaction amount listed of $37.85, this amount may be again checked for accuracy after processing to ensure that it matches. As indicated in FIG. 4, a data validator may perform such a check. A data operation performed by data streaming application 205 may also be checked. For example, if a piece of data should be removed by the streaming application (e.g. certain privacy or financially sensitive data should be deleted, such as a credit card expiration date), the output data from data streaming application 205 can be checked to ensure that no pieces of this data are present after processing. Thus, various different data may be checked to ensure correctness. Because data content checking can potentially be an expensive operation, this checking may be done on a sampled basis (e.g. only one in every 1,000 database records, or some other frequency) may be checked for data content.

Validation of stream processing application 205 (e.g. following restart after an update) can also include comparing count metrics to determine that the proper number of database messages (e.g. data from database records) are present both before and after processing by the stream processing application. If the count metrics do not match, this may indicate that one or more messages are being dropped by the stream processing application, which can indicate an error. In other words, inbound and outbound message counts for stream processing application 205 should match, in various embodiments.

Accordingly, performing a validation in operation 560 can include comparing a count of unique database messages inbound to the stream processing application at a first point prior to processing those messages to a count of unique database messages outbound from the stream processing application at a second point subsequent to those messages being processed by the stream processing application. Thus, for example, message count can be checked at database adapter 305 and/or message queue 310 and compared to message count at (outbound) message queue 320 (note that in some instances, all three of these message counts can be compared).

Validating stream processing application 205 may also include verifying that a process state of the application does not include any errors. Upon restart, for example, data engine 170 may confirm that each of one or more executable processes is up and running (e.g. being actively executed) and that those processes do not have an error.

In operation 570, data engine 170 rolls back stream processing application 205 to a stored checkpoint in response to the validation of operation 560 not succeeding, according to various embodiments. Rollback can be performed, for example, if pipeline metrics are not as expected, if message data sampling reveals that data content not matching as expected, and/or if message count is not correct.

When rolling back stream processing application 205 to a stored checkpoint, data engine 170 may remove a particular newly added executable file and replace it with a saved copy of an (older) executable file that had been replaced with the newly added executable file. More than one executable file may be replaced during a rollback. Configuration data may also be rolled back using configuration data saved when a backup checkpoint is taken. Thus, one or more settings for data streaming application 205 may be changed (reverted) back to previous settings when a restart is deemed to have failed validation (e.g., unique message count checks indicate a problem and/or content sampling indicates a problem).

Note that when the validation in operation 560 succeeds, the stream processing application will not actually be rolled back. Instead, operation 580 will be executed, according to various embodiments.

In operation 580, in response to the validation of operation 560 succeeding, data engine 170 determines not to roll back stream processing application 205 to a stored checkpoint and to allow the stream processing application to operate using one or more added new executable files. When resuming normal operations for stream processing application 205, one or more data pipelines that were paused may be resumed, and new pipelines can once again be opened (new pipelines can be prohibited during the update process and/or while a maintenance mode is turned on).

Figure 6:
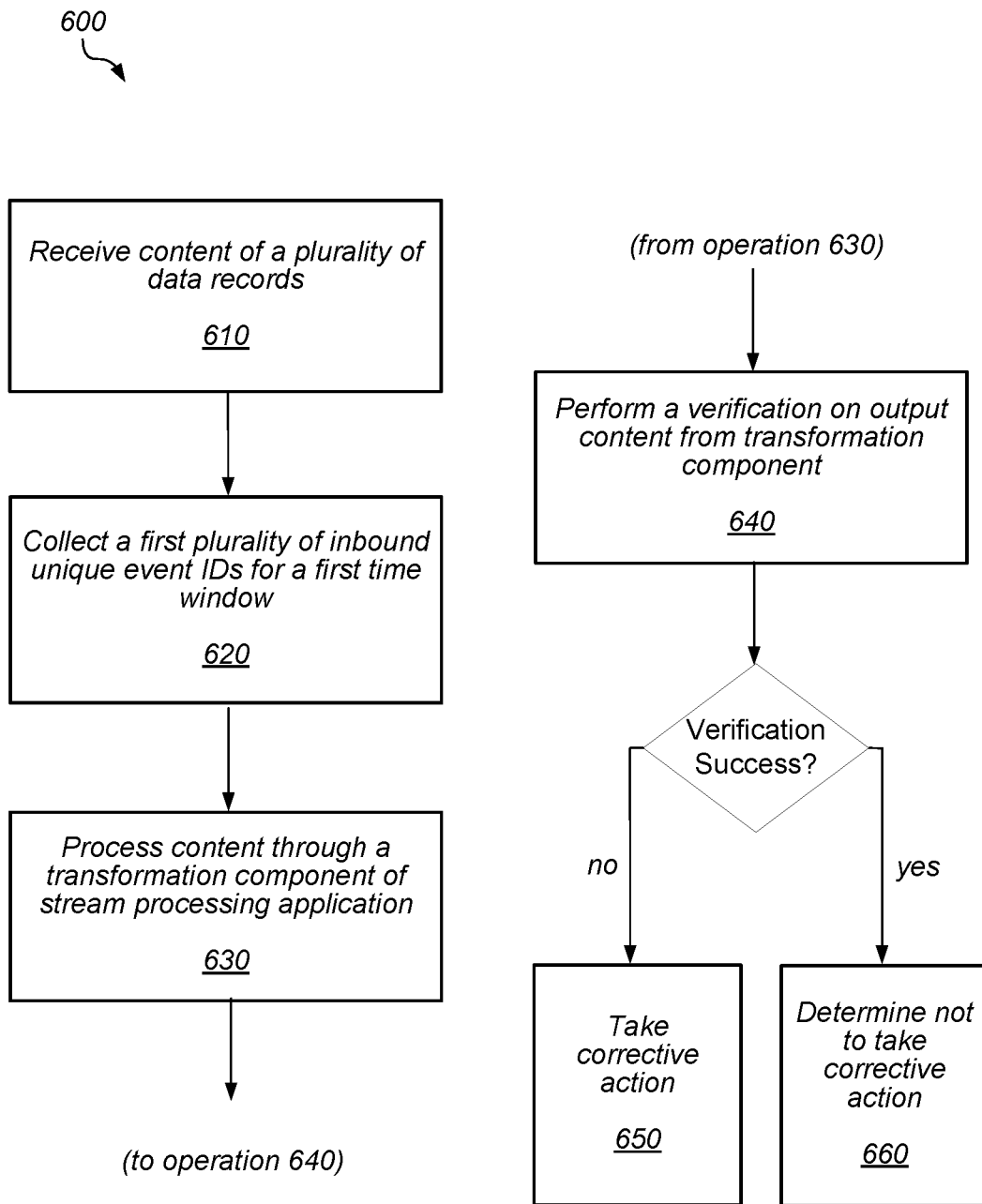
FIG. 6 illustrates a flowchart relating to a method of operating a stream processing application and detecting possible issues.

Turning to FIG. 6, a flowchart is shown of one embodiment of a method 600 relating to operating stream processing application 205 and detecting possible issues (e.g. for ordinary/ongoing operations rather than an update operation), according to various embodiments.

Operations described relative to FIG. 6 may be performed, in various embodiments, by any suitable computer system and/or combination of computer systems, including data engine 170.

For convenience and ease of explanation, operations described below will simply be discussed relative to data engine 170 rather than any other system, however. Further, various elements of operations discussed below may be modified, omitted, and/or used in a different manner or different order than that indicated. Thus, in some embodiments, data engine 170 may perform one or more operations while another system might perform one or more other operations. Note that any and all techniques and structures discussed above (e.g. relative to method 500) are applicable in method 600 according to various embodiments, and vice versa.

In operation 610, data engine 170 receives content of a plurality of data records from one or more source databases, according to some embodiments. This content may be received at stream processing application 205. The data records can include any variety of data in various embodiments, but in some embodiments include information related to electronic payment transactions (e.g. identifying a buyer/source of funds, a seller/destination of funds, a transaction amount, a funding instrument type, and/or other information). Entire database records (e.g. a row from a table) may be received in operation 610, or only a portion of a record may be received. This received content, as discussed below, is to be processed by stream processing application 205 according to various embodiments.

In operation 620, data engine 170 collects a first plurality of inbound unique event IDs for a first time window, where each of the first plurality of inbound unique event IDs corresponds to a particular database record change of one or more source databases, according to some embodiments. By collecting these unique event IDs, correct operation of data processing application 205 can be verified, as further explained below.

This collection process may proceed similarly as described above relative to FIG. 5. In the method of FIG. 6, however, no update and restart is being done for stream processing application 205, but rather, these techniques may be applied to a "steady state" of the stream processing application according to various embodiments. The counting process for unique event IDs can help verify that no database records (and/or record portions or other data) are being dropped as data migrates into and through stream processing application 205. Using a unique attribute such as the event ID for performing this count can be particularly helpful as in some embodiments, duplicate records may be inadvertently introduced into the inbound data stream for stream processing application 205. Thus, what may matter is not the total number of records (or portions thereof) inbound to a transformation component, but the total unique (net aggregate) number of records. As noted above, the event ID is unique within a particular data source attached to a data pipeline, in various embodiments. In operation 620, each of the first plurality of inbound unique event IDs corresponding to a particular database record of one or more source databases may mean that each unique event ID corresponds to a change in some database record (e.g. adding a new record, modifying an existing one). The event IDs may each correspond to different records (but more than one event ID can correspond to the same record, e.g., if that record was modified twice within the time window).

In operation 630, data engine 170 processes the content of the plurality of data records through a transformation component of the stream processing application, according to some embodiments. The transformation component may perform any number or type of operations on data that is sent to it. In one embodiment, this transformation component is router 315 (e.g. the transformation component may reside on a data pathway between a source database and one or more outbound message queues where data can be acquired by an end user (such as a software application).

Processing content that is sent to the transformation component can include masking particular types of data. For example, a database record sent to the transformation engine may include different categories of information within the PCI (Payment Card Industry) compliance standard. A primary account number or expiration date associated with a payment card might be permitted to be stored on data engine 170 and database 165, but not a destination system that will later acquire data from an outbound message queue. Such information may be masked (e.g. replaced with zero bits or otherwise obscured/eliminated) before a data record (or portion thereof) is sent out by the transformation component. Other policies besides PCI may also dictate what information is masked by the transformation component.

The transformation component can also alter one or more types of data according to various rules. A floating point number could be truncated to a particular length (e.g. two decimal places), whitespace could be stripped out of a data field, or a delimiting character could be replaced with something different. In general, any arbitrary data transformation can be performed by the transformation component in various embodiments.

Note that in some embodiments, however, a transformation component is not required. Thus, Router 315 (or another transformation component) may be omitted in various embodiments, and in such embodiments, data may be processed through stream processing application 205 without a transformation being applied.

In operation 640, data engine 170 performs a verification on output content destined from the transformation component to a group of one or more outbound message queues, according to some embodiments. Performing the verification may include determining whether each of a first plurality of unique event IDs has been collected at a location outbound from the stream processing application, according to various embodiments. Thus, a first number of unique data records (or portions thereof) can be counted before processing and after processing by the transformation component and compared. These counts are expected to be equal in various embodiments—no records should be dropped. If the post-processing count indicates a lesser number, however, this may indicate that the transformation component (or possibly some other component) has dropped one or more records. If a pre-processing count of database records is higher than the post-processing count, this indicates that one or more messages has been lost or mishandled, according to various embodiments (and thus, the verification process would fail). If the unique record counts match, however, then the verification process is considered a success.

The unique event IDs, for verification purposes, may be compared within single source database/data pipeline (e.g. a simple pipeline that only has one source). Thus, operation 640 may include a verification process being done on each pipeline—for example, all unique event IDs within a time window for data pipeline #1/source database #1 may be checked both pre- and post-processing, then unique event IDs for data pipeline #2/source database #2 may be checked, etc. There may be many different pipelines for stream processing application 205. The verification may succeed for one pipeline but fail for another pipeline; accordingly in some instances, a corrective action may be taken with respect to one data pipeline but not another data pipeline.

In operation 650, based on the verification failing, data engine 170 may take a corrective action regarding operating status of the stream processing application. If one or more messages has been dropped, one corrective action can be transmitting an alert message regarding the dropped messages. For example, an administrator, software support specialist, or another person could receive an email, text SMS message, or some other type of communication with details about the dropped message(s).

Another corrective action is to replay one or more of the event IDs (e.g. source database messages) that correspond to a change in database 165. Consider the scenario where each of the database records are marked with a unique commit time (e.g. a unique time at which a database recorded the completion of an electronic payment transaction from a payer of funds to a receiver of funds). If one of the event IDs gets dropped within stream processing application 205, this event ID can be replayed until its associated data is successfully detected as leaving stream processing application 205 (e.g. when the event ID shows up at the final outbound location associated with the application, such as message queue 320 in various embodiments).

Thus in some embodiments, replay of a missing event ID is continued indefinitely until 100% of unique inbound messages are reflected as being sent out by a component (e.g. router 315). If one or more messages are again dropped, stream processing application 205 may continue to replay those messages until all messages are correctly handled, which can help ensure 100% reliability for end users (such as an application that may display completed transaction results to users of an electronic payment service).

Note that messages may be replayed from any different stage of a data pipeline, in various embodiments. Thus, if a unique event ID is seen at database adapter 305 and at message queue 310, but is not later detected at message queue 320, it can be determined that message was lost/mishandled by router 315 (using the architecture of FIG. 3 as an example). The lost message can then be replayed from message queue 310, rather than having to go back to source database 165 (for example) to retrieve the missing database message. This flexible architecture can reduce database reads for lost messages. Logs of inbound data can be kept at each of the pipeline stages in order to facilitate replay from individual pipeline stages.

A latency metric can be associated with a given database message/event ID as well. For example, an SLA for stream processing application 205 may specific that 99.9% (or some other amount) of messages must be delivered within 60 seconds (or some other time period). An SLA could also state that 100% of messages must be delivered within 120 seconds (or some other time period). If replaying a message (particularly if the message is replayed more than once) results in this SLA time being violated, a latency alert message may be sent to an administrator or other person to let them know that there may be a problem with the streaming application that needs manual intervention. Message replay can also be multithreaded—e.g., the stream processing application can use different process threads so that new messages can continue to be processed even if an old message is being replayed so that a problem with a particular window message frame does not significantly impact future streaming operations.

A message that gets lost within a database pipeline will continue to be replayed, in various embodiments, until that message is successfully processed and output by stream processing application 205. In the case where a software bug has caused a particular message to be repeatedly dropped, for example, the latency metric for that message may continue to rise as that message fails to be processed correctly, and an alert can be sent for that message. If human intervention then fixes the underlying problem (e.g. through a bug fix, restarting some pipeline component, etc.), that old message can then be successfully processed. Because stream processing application 205 is expected to process 100% of messages in various embodiments, a high latency for one or more messages can be indicative of a problem that needs addressing. (These latency metrics are also applicable on restart after and update—if one or more messages/event IDs have sufficiently high latency metrics then the update may be rolled back.)

In operation 660, based on the verification succeeding, data engine 170 may determine not to take the corrective action. Accordingly, if a unique message count before data processing by the transformation component matches a post-processing unique message count, data engine 170 may determine that stream processing application 205 is operating correctly. If the application is operating correctly, no corrective action (such as an alert) may be needed, and thus, no additional steps need to be undertaken in response to the verification process. Instead, the system may continue to operate as planned, and additional verification processes may be undertaken periodically. In various embodiments, the verification process may be repeated indefinitely so that stream processing application 205 is continually monitored. The process outlined in method 600 may be performed for successive windows of time, every 60 seconds (or some other interval of time, greater or smaller) for example, so that reliability of stream processing application 205 is ensured and enhanced.

Note that while many examples herein discuss streaming enhancements relative to a source database with electronic transaction information, the techniques of this specification can be generalized to any number of other types of data streaming platforms.

Computer-Readable Medium

Figure 7:
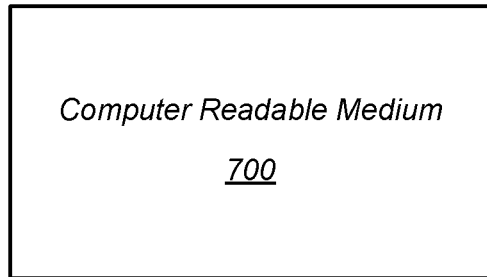
FIG. 7 is a diagram of a computer readable medium, according to some embodiments.

Turning to FIG. 7 a block diagram of one embodiment of a computer-readable medium 700 is shown. This computer-readable medium may store instructions corresponding to the operations of FIGS. 5 and 6 and/or any techniques described herein. Thus, in one embodiment, instructions corresponding to data engine 170 may be stored on computer-readable medium 700.

Note that more generally, program instructions may be stored on a non-volatile medium such as a hard disk or FLASH drive, or may be stored in any other volatile or non-volatile memory medium or device as is well known, such as a ROM or RAM, or provided on any media capable of staring program code, such as a compact disk (CD) medium, DVD medium, holographic storage, networked storage, etc. Additionally, program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the present invention can be implemented in any programming language that can be executed on a server or server system such as, for example, in C, C+, HTML, Java, JavaScript, or any other scripting language, such as Perl. Note that as used herein, the term "computer-readable medium" refers to a non-transitory computer readable medium.

Computer System

Figure 8:
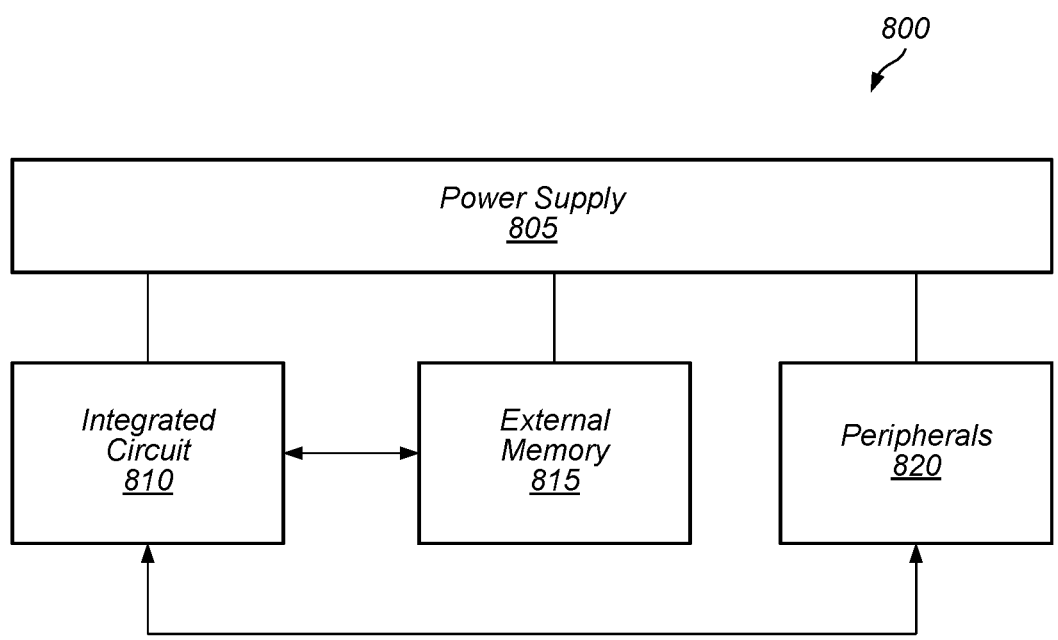
FIG. 8 is a block diagram of a system, according to some embodiments.

In FIG. 8, one embodiment of a computer system 800 is illustrated. Various embodiments of this system may be included in front end server 120, backend server 160, data engine 170, or any other computer system.

In the illustrated embodiment, system 800 includes at least one instance of an integrated circuit (processor) 810 coupled to an external memory 815. The external memory 815 may form a main memory subsystem in one embodiment. The integrated circuit 810 is coupled to one or more peripherals 820 and the external memory 815. A power supply 805 is also provided which supplies one or more supply voltages to the integrated circuit 810 as well as one or more supply voltages to the memory 815 and/or the peripherals 820. In some embodiments, more than one instance of the integrated circuit 810 may be included (and more than one external memory 815 may be included as well).

The memory 815 may be any type of memory, such as dynamic random access memory (DRAM), synchronous DRAM (SDRAM), double data rate (DDR, DDR2, DDR6, etc.) SDRAM (including mobile versions of the SDRAMs such as mDDR6, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit 810 in a chip-on-chip configuration, a package-on-package configuration, or a multi-chip module configuration.

The peripherals 820 may include any desired circuitry, depending on the type of system 800. For example, in one embodiment, the system 800 may be a mobile device (e.g. personal digital assistant (PDA), smart phone, etc.) and the peripherals 820 may include devices for various types of wireless communication, such as Wi-fi, Bluetooth, cellular, global positioning system, etc. Peripherals 820 may include one or more network access cards. The peripherals 820 may also include additional storage, including RAM storage, solid state storage, or disk storage. The peripherals 820 may include user interface devices such as a display screen, including touch display screens or multitouch display screens, keyboard or other input devices, microphones, speakers, etc. In other embodiments, the system 800 may be any type of computing system (e.g. desktop personal computer, server, laptop, workstation, net top etc.). Peripherals 820 may thus include any networking or communication devices. By way of further explanation, in some embodiments system 800 may include multiple computers or computing nodes that are configured to communicate together (e.g. computing cluster, server pool, cloud computing system, etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed by various described embodiments. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A system, comprising:
a processor; and
a memory having stored thereon instructions that are executable to cause the system to perform operations comprising:
halting a stream processing application;
saving a backup checkpoint for the stream processing application;
subsequent to the halting the stream processing application, performing an update comprising adding one or more new executable files to the stream processing application;
after the update, restarting the stream processing application;
subsequent to the restarting, performing a validation on the stream processing application, including:
collecting a first plurality of inbound unique event IDs for a first time window after the restarting, wherein each of the first plurality of inbound unique event IDs corresponds to a particular database record;
subsequent to an end of the first time window, determining whether each of the first plurality of inbound unique event IDs has been collected at a location outbound from the stream processing application; and
comparing pre-processing data content to post-processing data content output by the stream processing application; and
in response to the validation not succeeding, rolling back the stream processing application to the backup checkpoint; or
in response to the validation succeeding, determining not to roll back the stream processing application to the backup checkpoint and allowing the stream processing application to operate using the added one or more new executable files.

2. The system of claim 1, wherein determining whether each of the first plurality of inbound unique event IDs has been collected at the location outbound from the stream processing application includes waiting a particular period of time before determining whether a given unique event ID is missing.

3. The system of claim 2, wherein the operations further comprise placing the stream processing application into a maintenance mode prior to the restarting, wherein the maintenance mode prevents restarting a data pipeline that is halted due to the maintenance mode being on.

4. The system of claim 3, wherein the maintenance mode prevents new data pipelines being started by the stream processing application.

5. The system of claim 1, wherein performing the validation on the stream processing application includes verifying that a process state of the stream processing application does not include any errors.

6. The system of claim 1, wherein saving the backup checkpoint includes saving a copy of a first executable file of the stream processing application that will be replaced by a particular one of the one or more new executable files.

7. The system of claim 6, wherein rolling back the stream processing application to the backup checkpoint includes removing the particular new executable file and replacing it with the saved copy of the first executable file.

8. The system of claim 1, wherein halting the stream processing application comprises stopping execution of one or more executable processes of the stream processing application.

9. The system of claim 8, wherein restarting the stream processing application comprises initiating execution of the stopped one or more executable processes of the stream processing application.

10. A method relating to updating a stream processing application, comprising:
saving a backup checkpoint for the stream processing application;
a computer system halting the stream processing application;
subsequent to halting the stream processing application, the computer system performing an update of the stream processing application comprising added one or more new executable files to the stream processing application;
after the update, the computer system restarting the stream processing application;
subsequent to the restarting, performing a validation on the stream processing application, including:
collecting a first plurality of inbound unique event IDs for a first time window after the restarting, wherein each of the first plurality of inbound unique event IDs corresponds to a particular database record; and
subsequent to an end of the first time window, determining whether each of the first plurality of inbound unique event IDs has been collected at a location outbound from the stream processing application; and
in response to the validation succeeding, the computer system determining not to roll back the stream processing application to the backup checkpoint.

11. The method of claim 10, wherein the determining whether each of the first plurality of inbound unique event IDs has been collected occurs at an outbound message queue to which the stream processing application has delivered outbound data.

12. The method of claim 10, wherein performing the validation further comprises:
collecting a second plurality of inbound unique event IDs for a second time window after the restart that is subsequent to the first time window, wherein each of the second plurality of inbound unique event IDs corresponds to a second particular database record; and
subsequent to the end of the second time window, determining whether each of the second plurality of unique event IDs has been collected at the location outbound from the stream processing application.

13. The method of claim 10, wherein the first plurality of inbound unique event IDs are collected via a database adapter coupled to a source database.

14. The method of claim 13, wherein the source database includes a transaction database having stored database records indicative of a plurality of electronic transactions between a plurality of users of an electronic service.

15. The method of claim 10, wherein the location outbound from the stream processing application is a message queue configured to store outbound data for multiple pipelines.

16. The method of claim 10, wherein the stream processing application is configured to output streaming data within a specified amount of time after receiving information sent to the stream processing application.

17. A non-transitory computer-readable medium having stored thereon instructions that when executed by a computer system cause the computer system to perform operations comprising:
halting a stream processing application;
saving a backup checkpoint for the stream processing application;
subsequent to halting the stream processing application, performing an update comprising adding one or more new executable files to the stream processing application;
after the update, restarting the stream processing application;
subsequent to the restarting, performing a validation on the stream processing application, including:
collecting a first plurality of inbound unique event IDs for a first time window after the restarting, wherein each of the first plurality of inbound unique event IDs corresponds to a particular database record;
subsequent to an end of the first time window, determining whether each of the first plurality of inbound unique event IDs has been collected at a location outbound from the stream processing application; and
comparing pre-processing data content to post-processing data content output by the stream processing application; and
in response to the validation not succeeding, rolling back the stream processing application to the backup checkpoint; or
in response to the validation succeeding, determining not to roll back the stream processing application to the backup checkpoint and allowing the stream processing application to operate using the added one or more new executable files.

18. The non-transitory computer-readable medium of claim 17, wherein saving the backup checkpoint includes saving a copy of one or more configuration settings for the stream processing application that will be replaced by one or more new configuration settings.

19. The non-transitory computer-readable medium of claim 17, wherein the one or more new executable files include content other than executable code.

20. The non-transitory computer-readable medium of claim 17, wherein saving the backup checkpoint includes saving a copy of a first executable file of the stream processing application that will be replaced by a particular one of the one or more new executable files.

* * * * *